Patented Sept. 17, 1940

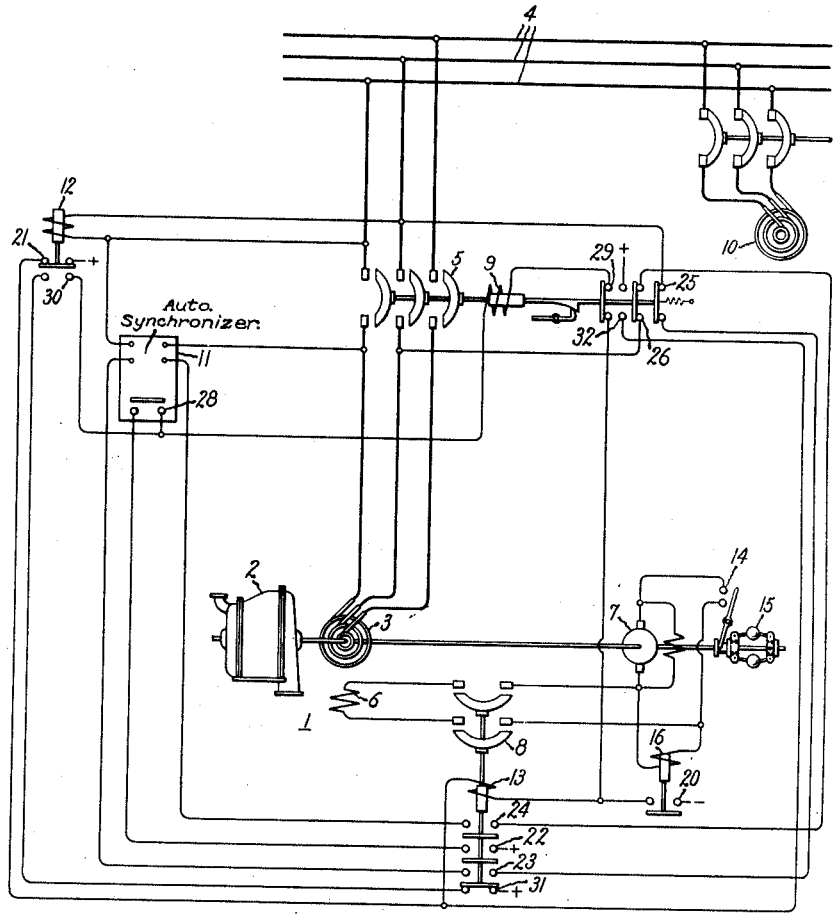

2,215,063

UNITED STATES PATENT OFFICE 2,215,063

SYNCHRONIZING EQUIPMENT

Herman Bany, Lansdowne, Pa., assignor to General Electric Company, a corporation of New York Application April 28, 1939, Serial No. 270,585

13 Claims. (Cl. 171—118)

My invention relates to synchronizing equipments and particularly to automatic synchronizing equipments for alternating current generators. In such synchronizing equipments it is often desirable to incorporate the feature of connecting the generator to the load circuit in case the load circuit is deenergized. In order to accomplish this result, it has been the practice to use one or more undervoltage relays connected to the load circuit and provided with contacts which are arranged to effect the immediate closing of the circuit breaker between the generator and the load circuit as soon as the generator is in an operative electrical condition to be synchronized. With such an undervoltage relay arrangement, however, there is the possibility of the relay becoming deenergized for some reason while the load circuit is still energized in which case the energized machine may be connected to an energized load circuit when the voltages thereof are so materially out of phase as to produce serious damage to the generator or other electrical apparatus connected to the load circuit.

One object of my invention is to provide an improved control equipment for use in conjunction with an automatic synchronizing arrangement for an alternating current generator which will permit the generator to be connected to a deenergized load circuit without the danger mentioned above of connecting an excited generator to an energized load circuit due to the faulty indication of an undervoltage relay.

In accordance with my invention, I accomplish this result by selectively controlling the field excitation of the generator and the connection between the generator and the load circuit in accordance with the voltage of the load circuit.

My invention will be understood from the following description when taken in connection with the accompanying drawing, the single figure of which diagrammatically illustrates a control system for connecting an alternating current generator to an alternating current load circuit, and its scope will be pointed out in the appended claims.

Referring to the drawing, 1 represents a synchronous generator which is driven by a suitable prime mover 2 the speed of which may be varied in any suitable manner examples of which are well known in the art. The generator 1 includes an armature 3 which is arranged to be connected to a load circuit 4 by suitable connecting means 5 and a field winding 6 which is arranged to be connected to a suitable source of excitation 7 by the switching means 8. As shown in the drawing, the source of excitation 7 is a direct current exciter driven by the prime mover 2. The connecting means 5 is shown as a latched closed circuit breaker having a closing coil 9. The load circuit 4 is normally energized by one or more sources of current such as a generator 10. Suitable automatic synchronizing means 11 is provided for effecting the energization of the closing means 9 when a predetermined relation exists between the phases, magnitudes and frequencies of the generator 1 and the load circuit 4. Since such automatic synchronizing means are well known in the art and the details thereof form no essential part of my present invention, the automatic synchronizing means is symbolically represented by a rectangle.

A voltage relay 12 connected so as to be responsive to the voltage of the load circuit is provided so as to control the sequence in which the closing coils 9 and 13 of the switches 5 and 8, respectively, are closed. If the voltage of the load circuit 4 is above a predetermined value and at the same time the speed of the generator 1 is such that the contacts 14 of an associated speed switch 15 are closed and the contacts 20 of an exciter voltage relay 16 are closed, a circuit is completed for the closing coil 13 of the field switch 8 before the circuit breaker 5 is closed.

However, if the voltage of the load circuit 4 is below a predetermined value and at the same time the speed of the generator 1 is such that the contacts 20 of the voltage relay 16 are closed, the closing coil 9 of the circuit breaker 5 is energized before the closing coil 13 of the field switch 8 is energized.

The operation of the arrangement shown in the drawing is as follows: When it is desired to place the generator 1 in operation, the prime mover 2 is started and the speed thereof is adjusted in any well known manner in the art so as to bring the generator 1 up to substantially its normal operating speed. When the speed of the generator reaches a predetermined value, the speed switch 15 closes its contacts 14 and the exciter voltage relay 16 closes its contacts 20. If, when the contacts 20 are closed, the voltage of the load circuit 4 is above a predetermined value so that the contacts 21 of the voltage relay 12 are closed, an energizing circuit is completed for the closing coil 13 of the field switch 8. The closing of the main contacts of the field switch 8 connects the exciter 7 across the terminals of the field winding 6 of the generator 1 so that the generator voltage starts to build up towards its normal value. The closing of the auxiliary contacts 22, 23 and 24 of the field switch 13 in conjunction with the closed auxiliary contacts 25 and 26 of the open circuit breaker 5 render the automatic synchronizing means operative. The automatic synchronizing means 11 then operates in the manner well known in the art to produce a predetermined relation between the phases, magnitudes and frequencies of the generator 1 and the load circuit 4, and when this predetermined relation is obtained, the automatic synchronizing means 11 closes its contacts 28 and thereby completes an energizing circuit for the closing coil 9 of the circuit breaker 5 to connect the energized generator 1 to the load circuit 4. This energizing circuit also includes the contacts 22 of the closed field switch 8, the auxiliary contacts 29 of the open circuit breaker 5 and the contacts 20 of the energized exciter voltage relay 16.

If, when the relay 16 closes its contacts 20, the voltage of the load circuit 4 is below a predetermined value so that the contacts 30 of the voltage relay 12 are closed, an energizing circuit is immediately completed for the closing coil 9 of the circuit breaker 5 through the contacts 31 of the open field switch 8 and the auxiliary contacts 29 of the open circuit breaker 5. The closing of the circuit breaker 5 under these conditions connects the unexcited generator 1 to the load circuit 4. As soon as the circuit breaker 5 closes, its auxiliary contacts 32 complete through contacts 20 of the exciter voltage relay 16 an energizing circuit for the closing coil 13 of the field switch 8 so that the generator voltage then builds up to its normal value. The closing of the auxiliary contacts 22, 23 and 24 of the field switch 8 under these conditions does not render the automatic synchronizing means 11 operative because the contacts 25 and 26 of the circuit breaker 5 are opened at this time.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, a synchronous machine having a field winding, an electric circuit, means for connecting said machine to said circuit, a source of excitation for said field winding, and means controlled by the voltage of said circuit for effecting the operation of said connecting means and the subsequent energization of said field winding by said source if the voltage of said circuit is below a predetermined value and for effecting the energization of said field winding by said source and the subsequent operation of said connecting means if the voltage of said circuit is above a predetermined value.

2. In combination, a synchronous generator having a field winding, an electric circuit, means for connecting said generator to said circuit, a source of excitation for said field winding, switching means for connecting said source to said field winding, automatic synchronizing means operative in response to the closing of said switching means for effecting the operation of said connecting means, and means controlled by the voltage of said circuit for effecting the closing of said switching means when the voltage of said circuit is above a predetermined value and the operation of said connecting means when the voltage of said circuit is below a predetermined value.

3. In combination, a synchronous generator having a field winding, an electric circuit, means for connecting said generator to said circuit, a source of excitation for said field winding, switching means for connecting said source to said field winding, automatic synchronizing means operative in response to the closing of said switching means for effecting the operation of said connecting means, and means controlled by the voltage of said circuit for effecting the closing of said switching means when the voltage of said circuit is above a predetermined value and the operation of said connecting means independently of said synchronizing means when the voltage of said circuit is below a predetermined value and said switching means is open.

4. In combination, a synchronous generator having a field winding, an electric circuit, means for connecting said generator to said circuit, a source of excitation for said field winding, switching means for connecting said source to said field winding, automatic synchronizing means operative in response to the closing of said switching means for effecting the operation of said connecting means, means controlled by the voltage of said circuit for effecting the closing of said switching means when the voltage of said circuit is above a predetermined value and the operation of said connecting means when the voltage of said circuit is below a predetermined value, and means controlled by said connecting means for effecting the closing of said switching means when it is open and said generator is connected to said circuit.

5. In combination, a synchronous machine having a field winding, an electric circuit, means controlled by the voltage of said circuit for automatically synchronizing said machine and circuit when said machine is disconnected from said circuit and the voltage of said circuit is above a predetermined value, and means controlled by the voltage of said circuit for connecting said machine to said circuit with said field winding unexcited and then exciting said field winding to pull the machine into synchronism when said machine is disconnected from said circuit and the voltage of said circuit is below a predetermined value.

6. In combination, a synchronous machine having a field winding, an electric circuit, means for connecting said machine to said circuit, a source of excitation for said field winding of said machine, switching means for connecting said source to said field winding, means controlled by said connecting means and said switching means for effecting the closing of said connecting means when said connecting means is open and said switching means is closed, means controlled by the voltage of said circuit for effecting the closing of said switching means when said voltage is above a predetermined value, and means controlled by the voltage of said circuit for effecting the closing of said connecting means when the voltage of said circuit is below a predetermined value.

7. In combination, a synchronous machine having a field winding, an electric circuit, means for connecting said machine to said circuit, a source of excitation for said field winding of said machine, switching means for connecting said source to said field winding, means controlled by said connecting means and said switching means for effecting the closing of said connecting means when said connecting means is open and said switching means is closed, means controlled by the voltage of said circuit for effecting the closing of said switching means when said voltage is above a predetermined value, and means controlled by the voltage of said circuit and the position of said switching means for effecting the closing of said connecting means when the voltage of said circuit is below a predetermined value and said switching means is open.

8. In combination, a synchronous machine having a field winding, an electric circuit, means for connecting said machine to said circuit, a source of excitation for said field winding of said machine, switching means for connecting said source to said field winding, means controlled by said connecting means and said switching means for effecting the closing of said connecting means when said connecting means is open and said switching means is closed, means controlled by the voltage of said circuit for effecting the closing of said switching means when said voltage is above a predetermined value, means controlled by the voltage of said circuit and the position of said switching means for effecting the closing of said connecting means when the voltage of said circuit is below a predetermined value and said switching means is open, and means responsive to the closing of said connecting means when said switching means is open for effectting the closing of said switching means.

9. In combination, a synchronous machine having a field winding, an electric circuit, means for connecting saaid machine to said circuit, a source of excitation for said field winding of said machine, switching means for connecting said source to said field winding, means controlled by the speed of said machine, means controlled by said speed controlled means and the voltage of said circuit for closing said switching means when the speed of said machine and the voltage of said circuit are above predetermined values, means controlled by said speed controlled means and the position of said connecting means for closing said switching means when the speed of said machine is above a predetermined value and said connecting means is closed, means controlled by said switching means for closing said connecting means after said switching means is closed, and means controlled by said switching means and the voltage of said circuit for closing said connecting means when said switching means is open and the voltage of said circuit is below a predetermined value.

10. In combination, a synchronous machine having a field winding, an electric circuit, means for connecting said machine to said circuit, a source of excitation for said field winding of said machine, switching means for connecting said source to said field winding, means controlled by the speed of said machine, means controlled by said speed controlled means and the voltage of said circuit for closing said switching means when the speed of said machine and the voltage of said circuit are above predetermined values, means controlled by said speed controlled means and the position of said connecting means for closing said switching means when the speed of said machine is above a predetermined value and said connecting means is closed, means controlled by said switching means for closing said connecting means after said switching means is closed, and means controlled by said switching means and the voltage of said circuit and said speed controlled means for closing said connecting means when said switching means is open and the voltage of said circuit is below a predetermined value and the speed of said machine is above a predetermined value.

11. In combination, a synchronous machine having a field winding, an electric circuit, switching means for connecting said machine to said circuit, a source of excitation, other switching means for connecting said source to said field winding, and means controlled by the voltage of said circuit for effecting the sequential closing of said switching means in one order when the voltage of said circuit is above a predetermined value and in the opposite order when the voltage of said circuit is below a predetermined value.

12. In combination, a synchronous machine, an electric circuit, means for synchronizing said machine with said circuit by controlling the field and armature circuit connections of said machine in one manner, means for synchronizing said machine with said circuit by controlling the field and armature circuit connections of said machine in a different manner, and means controlled by a predetermined electrical condition of said circuit for selectively determining which of said synchronizing means shall effect the synchronizing of said machine with said circuit.

13. In combination, a synchronous machine, an electric circuit, means for automatically synchronizing said machine with said circuit by controlling the field and armature circuit connections of said machine in one manner, means for automatically synchronizing said machine with said circuit by controlling the field and armature circuit connections of said machine in a different manner, and means controlled by the voltage of said circuit for selectively determining which of said synchronizing means shall effect the synchronizing of said machine with said circuit.

HERMAN BANY.